United States Patent [19]

Cronin et al.

[11] Patent Number: 4,611,505
[45] Date of Patent: Sep. 16, 1986

[54] VEHICULAR DIFFERENTIAL DRIVE ASSEMBLY AND MOUNTING MEANS THEREFOR

[75] Inventors: Michael G. Cronin, Peoria; Perry G. Cruce, Marquette Heights, both of Ill.

[73] Assignee: Caterpillar Inc., Peoria, Ill.

[21] Appl. No.: 781,612

[22] Filed: Sep. 30, 1985

[51] Int. Cl.⁴ .................. F16H 37/06; F16H 57/02
[52] U.S. Cl. .................. 74/720.5; 74/720; 74/607; 74/675
[58] Field of Search .......... 74/675, 687, 705, 710.5, 74/714, 606 R, 607, 720, 720.5

[56] References Cited

U.S. PATENT DOCUMENTS

| | | | |
|---|---|---|---|
| 2,326,755 | 8/1943 | Buckendale | 74/314 |
| 2,450,073 | 9/1948 | Avila | 74/314 |
| 2,533,610 | 12/1950 | Norelius | 74/720.5 |
| 2,569,651 | 10/1951 | Bannan | 74/720.5 |
| 2,835,144 | 5/1958 | Baxter, Jr. et al. | 74/675 |
| 4,126,201 | 11/1978 | Stevens | 180/70 |
| 4,170,152 | 10/1979 | Windish et al. | 74/606 R |
| 4,207,780 | 6/1980 | Saxton | 74/710.5 |
| 4,434,680 | 3/1984 | Riediger et al. | 74/682 |
| 4,526,063 | 7/1985 | Oster | 74/710.5 |

FOREIGN PATENT DOCUMENTS 1112410  8/1961  Fed. Rep. of Germany .

Primary Examiner—Kenneth J. Dorner
Assistant Examiner—Dirk Wright
Attorney, Agent, or Firm—Charles E. Lanchantin, Jr.

[57] ABSTRACT

Vehicle steering differential have heretofore had a number of assembly, disassembly and serviceability disadvantages or have not been compact enough. The instant differential drive assembly overcomes these deficiencies by including a differential steering mechanism having first and second input gears and a plurality of cooperatively associated planetary gear elements driven thereby, and a mounting structure for rotatably supporting the input gears and the planetary gear elements along a central axis and for modularly positioning the differential steering mechanism in a protected location within the opening of a vehicle case. The mounting structure includes a one-piece carrier body defining a mounting face that is adapted to engage another mounting face of the case.

23 Claims, 9 Drawing Figures

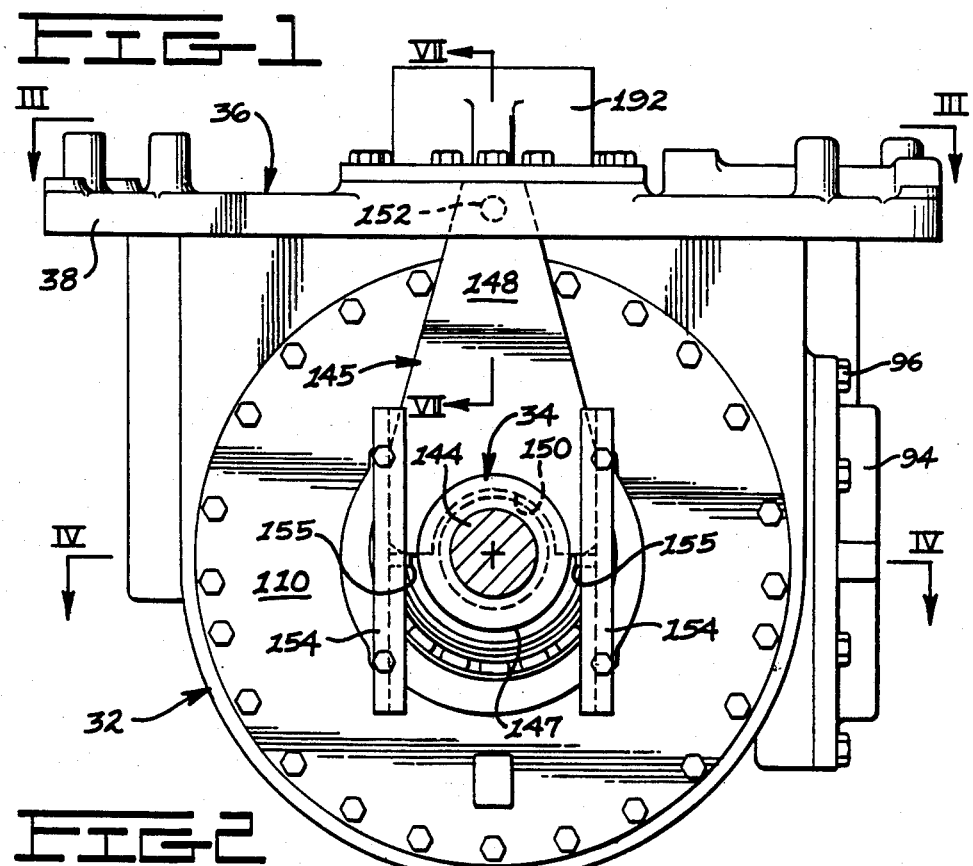
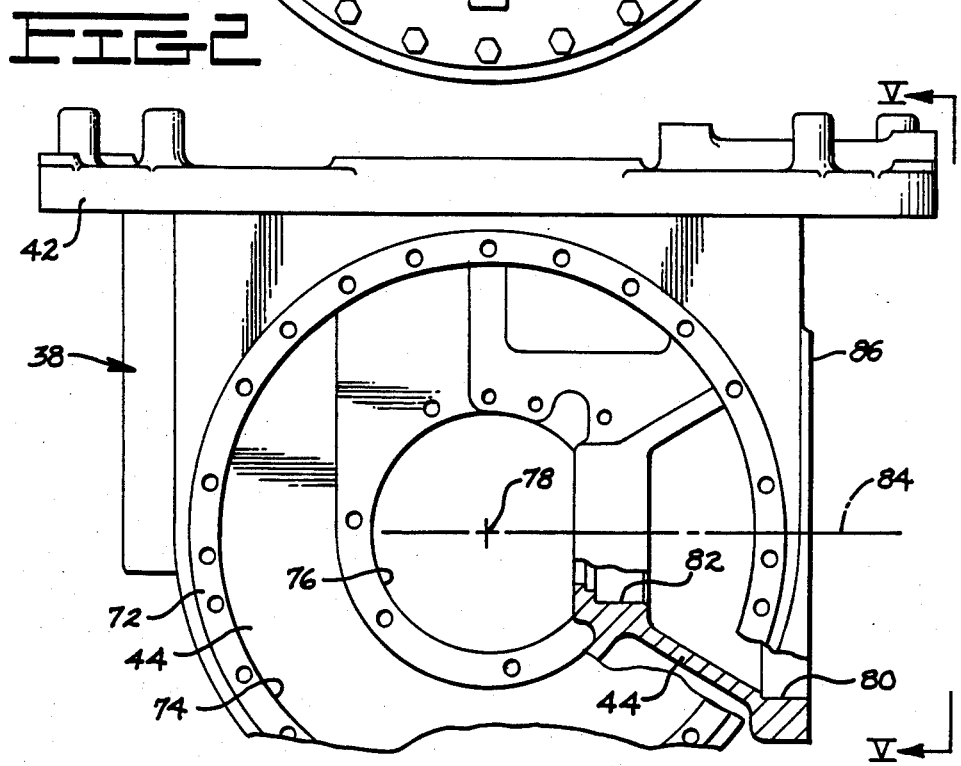

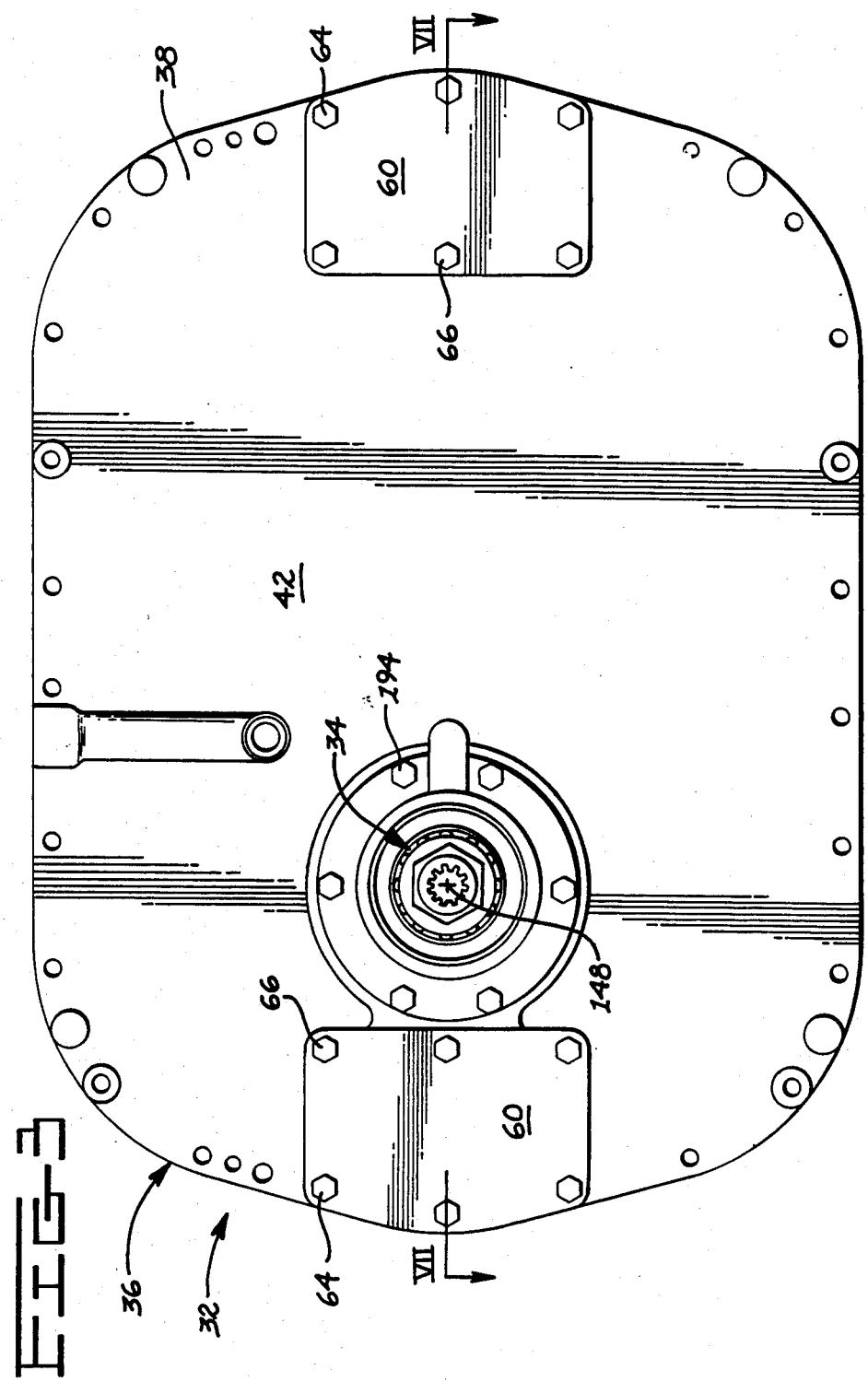

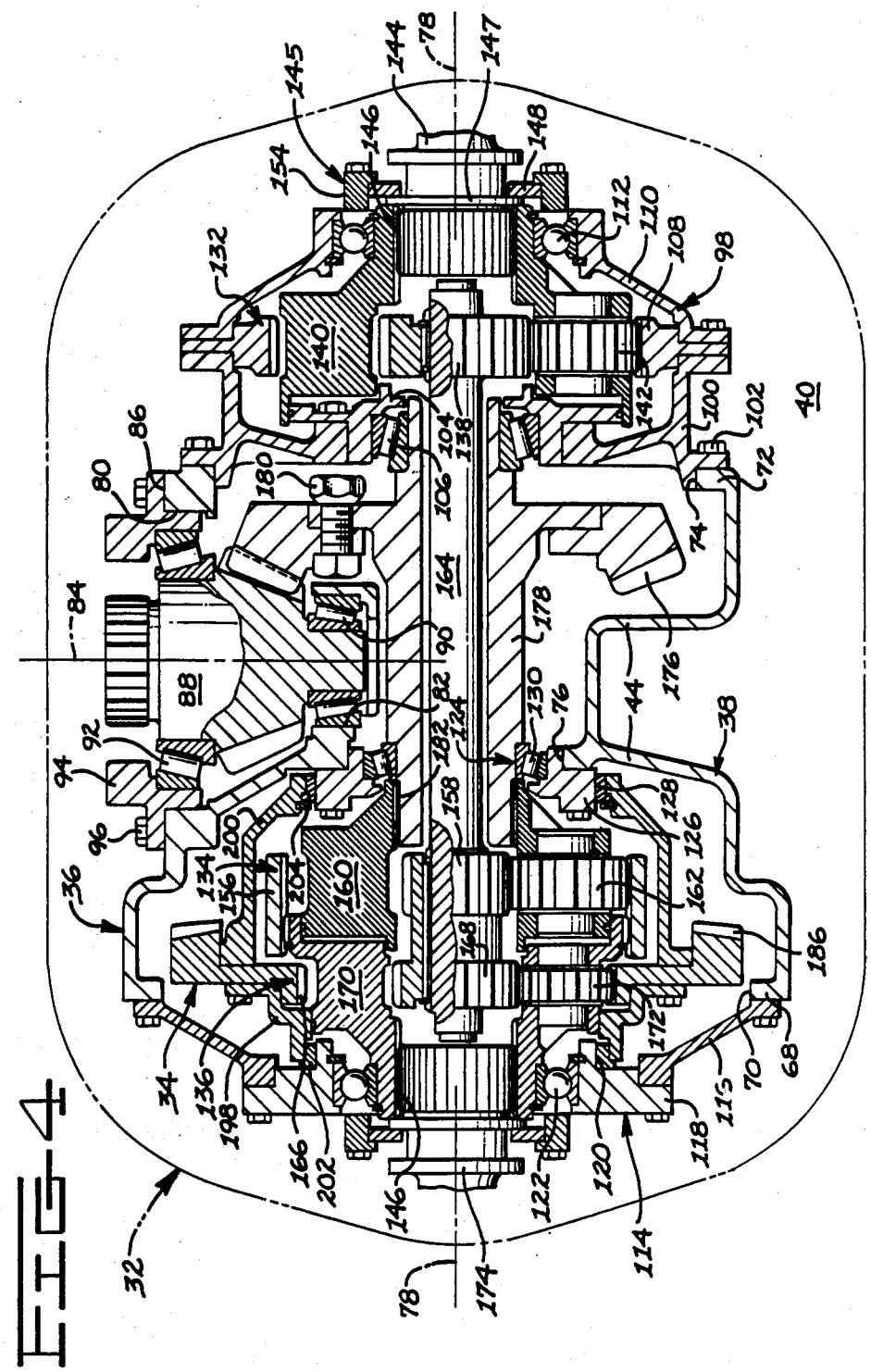

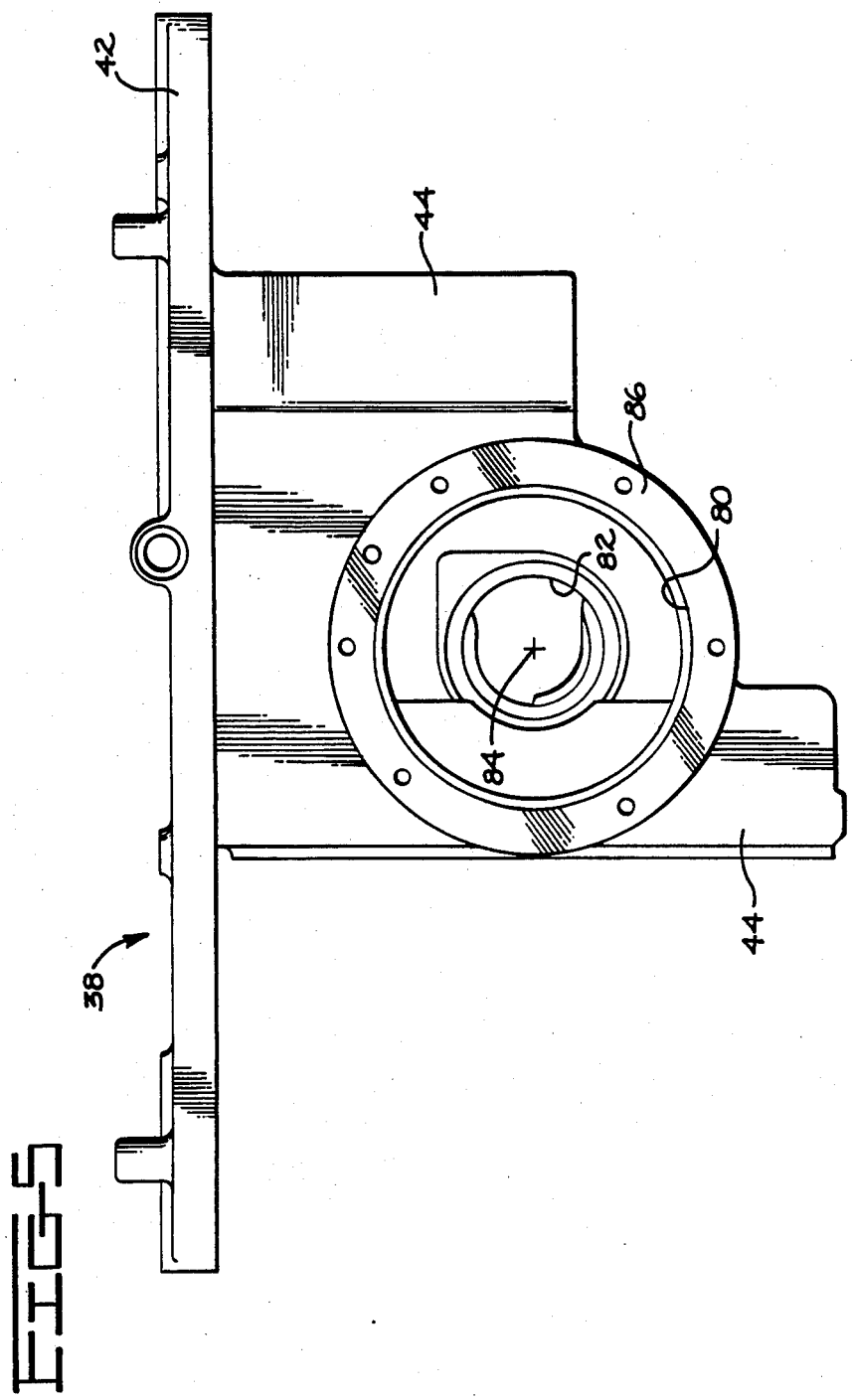

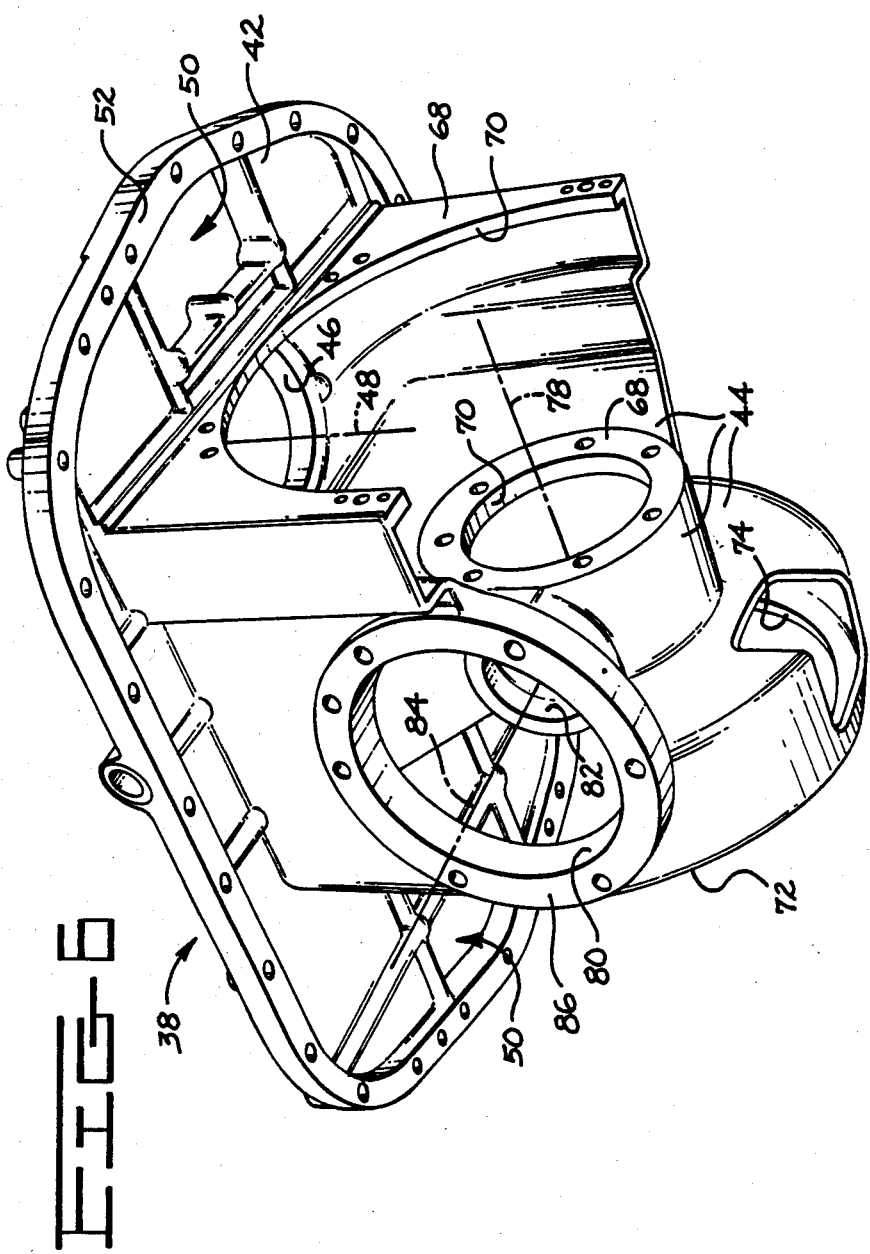

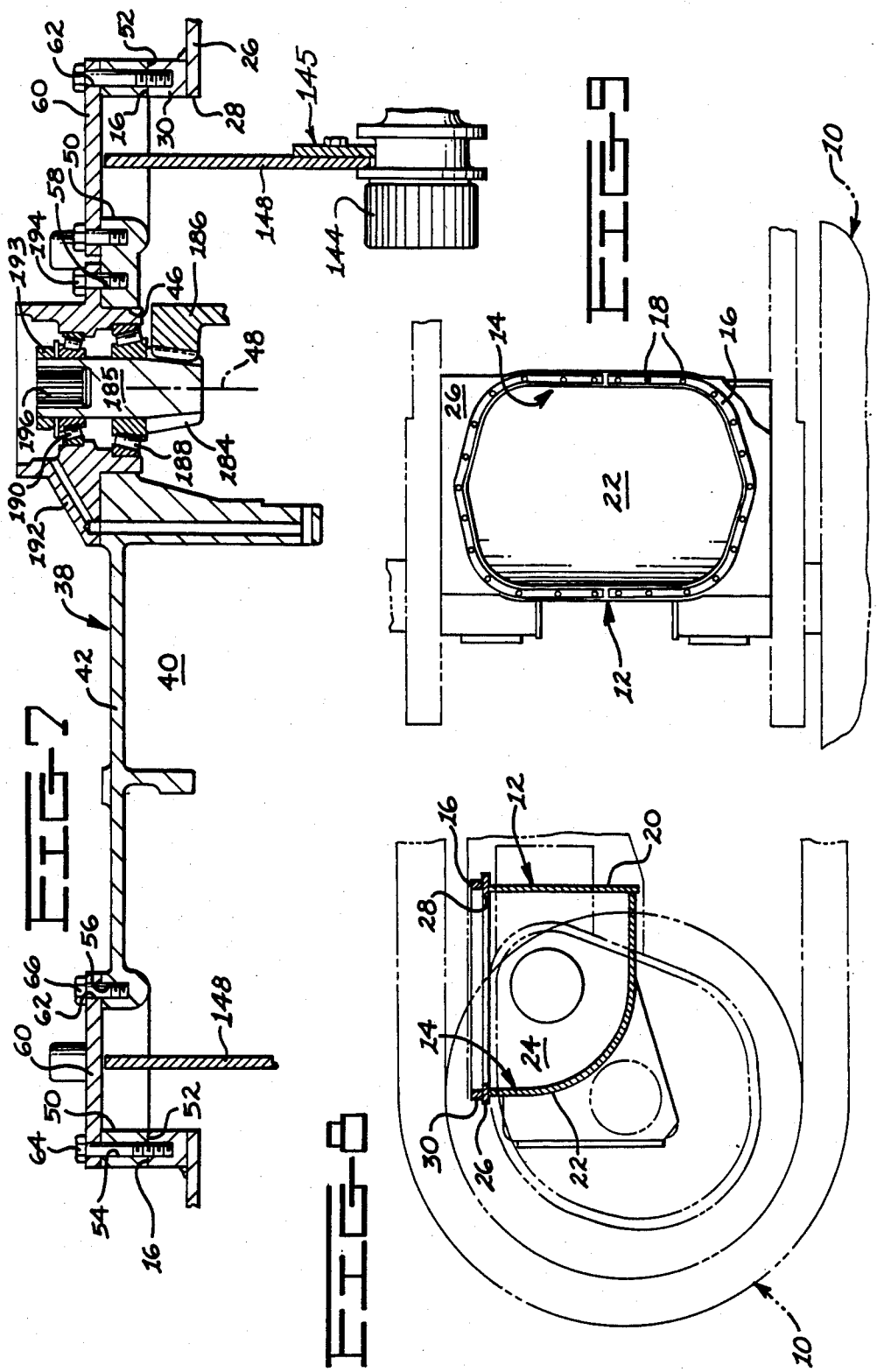

VEHICULAR DIFFERENTIAL DRIVE ASSEMBLY AND MOUNTING MEANS THEREFOR

TECHNICAL FIELD

This invention relates to a differential drive assembly for a vehicle, and more particularly to a compact differential steering mechanism and means for serviceably mounting the differential steering mechanism in the case of the vehicle.

BACKGROUND ART

A planetary steering differential which has been particularly effective for continuously driving the opposite output members of a track-type tractor at equal speeds for straight-ahead operation, or at different speeds for steering operation is disclosed in U.S. Pat. No. 4,434,680 issued Mar. 6, 1984 to C. W. Riediger, et al. However, the planetary steering differentials disclosed in that patent are not as compact as desired, and have a number of assembly, disassembly and serviceability disadvantages. One disadvantage resides in the orientation of the steering motor and associated input pinion on a horizontal, transverse axis. With such orientation, the steering motor is relatively inaccessibly located within the vehicle case and it is difficult to service it or the associated hydraulic lines connected to it. One solution to this resides in mounting the steering motor in a radial orientation external to the vehicle case as is disclosed in U.S. Pat. No. 4,557,157 issued Dec. 10, 1985 to E. D. Oestmann. But while the steering motor is accessible in that solution, major portions of the steering differential are added to the vehicle case through different openings so that considerable service time is required for assembling or disassembling the remainder thereof.

Another disadvantage with the steering differential of U.S. Pat. No. 4,434,680 is that the planetary steering differential is partly assembled or disassembled within the vehicle case by a mechanic leaning through an access opening. Still another problem is that it is difficult to disconnect the opposite axle shafts in order to allow removal of the planetary steering differential located therebetween.

Accordingly, what is needed is a compact planetary steering differential having a radial orientation of the steering motor at an external accessible location, and an efficacious mounting arrangement for rotatably supporting the elements of the planetary steering differential so that the majority thereof can be handled as a modular assembly capable of being easily connected to the vehicle frame. Specifically, it is preferred that the two bevel gear and pinion sets thereof be preadjusted in an effective manner as a subassembly before installation on the vehicle.

The present invention is directed to overcoming one or more of the problems as set forth above.

DISCLOSURE OF THE INVENTION

In accordance with one aspect of the present invention, a differential drive assembly is provided for a vehicle having a case defining an outwardly facing opening and a first mounting face about the opening, and including a differential steering mechanism having first and second input gears, and a plurality of interconnected planetary gear elements driven by the input gears. Mounting means are provided for rotatably supporting the input gears and the planetary gear elements along a central axis, and for modularly positioning the differential steering mechanism. Advantageously, the mounting means includes a one-piece carrier body defining a second mounting face connectable to the first mounting face and thereby positioning the differential steering mechanism in a protected location within the opening of the vehicle case.

More specifically, the opening of the vehicle case preferably faces upwardly, and the integrally cast carrier body includes a generally planar supporting portion or deck with a plurality of depending contoured walls. A plurality of bearing cages are releasably secured to the carrier body to rotatably support the input gears and the elements of the planetary steering differential in the appropriate locations, and the carrier body and planetary steering differential can be lowered as a modularized and preadjusted subassembly to a secured position on the case mounting face. In the instant embodiment the input gears are bevel gears, and each one is driven by a pinion gear. The pinion gears are rotatably supported by bearing cages on the carrier body along axes disposed at right angles to the central axis and preferably intersecting the central axis.

BRIEF DESCRIPTION OF THE DRAWINGS

FIG. 1 is a diagrammatic, right end, elevational view of one embodiment of the differential drive assembly of the present invention illustrating a locator mechanism for the right axle shaft.

FIG. 2 is a diagrammatic, right end, elevational view of solely the one-piece carrier body illustrated in FIG. 1 and with a portion broken away to show details of construction thereof.

FIG. 3 is a top plan view of the differential drive assembly as generally taken along line III—III of FIG. 1.

FIG. 4 is a diagrammatic, horizontal sectionalized view of the differential drive assembly as generally taken along line IV—IV of FIG. 1 with a few elements shown in elevation for clarity.

FIG. 5 is a diagrammatic, front elevational view of the one-piece carrier body illustrated in FIG. 2.

FIG. 6 is a diagrammatic, left front oblique view of the one-piece carrier body illustrated in FIGS. 2 and 5.

FIG. 7 is a diagrammatic, elevational, fragmentary sectionalized view of the upper portion of the differential drive assembly as taken along line VII—VII of FIG. 3 with a portion of the vehicle case added to illustrate the relationship thereof.

FIG. 8 is a diagrammatic, elevational, fragmentary, longitudinal sectionalized view of the vehicle case for receiving the differential drive assembly of FIG. 1, and illustrating in broken lines the outline of the final drive and the usual endless track driven thereby at the rear of the vehicle.

FIG. 9 is a diagrammatic, fragmentary, top plan view of the vehicle case shown in FIG. 8.

BEST MODE FOR CARRYING OUT THE INVENTION

Referring initially to FIGS. 8 and 9, a fragmentary view of the rear part of a track-type vehicle 10 is illustrated in phantom, along with a vehicle case or axle housing 12 shown in solid lines. The case defines an outwardly or upwardly facing opening 14, and a first or upwardly facing mounting face 16 peripherally about the opening which has a plurality of upwardly opening screwthreaded bores 18 therein. More specifically, the case includes a transversely oriented, front wall member 20, an arcuately blended upright rear wall and horizontal floor member 22, a pair of side wall members 24 (one shown), a horizontal upper plate member 26 defining a central opening 28 vertically therethrough, and a mounting base or upright rail 30 peripherally disposed on the plate member about the opening and defining the mounting face 16 and screwthreaded bores 18.

Referring next to FIGS. 1, 3 and 4, a compact differential drive assembly 32 is shown which includes an actuatable differential steering mechanism 34 and fixed mounting means or a mounting structure 36 for modularly supporting the differential steering mechanism for effective mating engagement with the vehicle case 12. In general, the differential drive assembly 32 is an independent module which forms a substantial portion of the power train for the vehicle 10 which, for example, can be of the type disclosed in previously mentioned U.S. Pat. No. 4,434,680.

Advantageously, the mounting means 36 includes a one-piece carrier body 38 that not only forms the primary support for the various rotating elements of the differential steering mechanism 34, but also serves to close off the case opening 14 and to define an enclosed compartment 40 within the vehicle case 12 for containing lubricant and excluding dirt or the like. The one-piece carrier body 38 is shown by itself in FIGS. 2, 5 and 6, and includes a generally planar supporting portion or deck 42 and a plurality of contoured walls 44 depending therefrom and preferably formed as an integral ferrous metal or aluminum casting with the planar supporting portion. More specifically, the deck 42 of the carrier body has an upright cylindrical bore 46 therethrough defining a vertical, central axis 48, and a pair of transversely opposite access openings 50 therethrough. As best shown in FIG. 7, the planar supporting portion 42 also defines a second or downwardly facing mounting face 52 about the periphery thereof and a first plurality of upright bores 54 therethrough around the periphery. Another plurality of blind screwthreaded bores 56 are defined about each of the access openings 50, and still another plurality of blind screwthreaded bores 58 are defined about the bore 46. Two access cover plates 60 are provided with a plurality of apertures 62 therethrough to permit first and second pluralities of fasteners 64 and 66 to be inserted therethrough and into screwthreaded engagement with the mounting base 30 and the planar supporting portion 42 respectively.

Referring to FIGS. 4 and 6, the generally depending contoured walls 44 of the carrier body 38 define a generally semicircular, left side mounting flange 68 and associated semicylindrical outer opening 70, an annular right side mounting flange 72 and associated cylindrical outer bore 74, and an inner centralized bore 76 arranged generally along a transverse central axis 78. The concentric disposition of the bores 74 and 76 is best shown in FIG. 2, and it can be seen that the contoured walls also define a cylindrical outer front bore 80 and a cylindrical inner bore 82 arranged along a horizontal, longitudinally oriented axis 84 which preferably intersects central axis 78. The front view of FIG. 5 shows the generally concentric disposition of the bores 80 and 82, and also illustrates a forwardly facing cylindrical mounting flange 86 adjacent the outer bore 80.

As shown in FIG. 4, the differential steering mechanism 34 can be seen to include a primary input pinion gear 88 supported by a pair of tapered roller bearing assemblies 90 and 92 for rotation about the longitudinal axis 84. The inner bearing assembly 90 is directly seated in the bore 82 of the carrier body 38, and the outer bearing assembly 92 is mounted in a bearing cage 94 inserted in the bore 80 and releasably connected to the mounting flange 86 by a plurality of screwthreaded fasteners 96.

The mounting means 36 further include right bearing support means 98 releasably connected to the carrier body 38 at the mounting flange 72. Particularly, such support means include an inner annular member 100 pilotably inserted in the bore 74 and connected to the flange 72 by a plurality of screwthreaded fasteners 102, and a bearing cage 104 releasably mounted within it and supporting a tapered roller bearing assembly 106. The right bearing support means further includes an internal ring gear element 108 connected to annular member 100, an outer annular member 110 connected to the ring gear element, and a ball bearing assembly 112 seated within the outer annular member.

At the opposite side, left bearing support means 114 are releasably connected to the carrier body 38 at the mounting flange 68. Specifically, that support means includes an inner annular member 116, a bearing cage 118 having a cylindrical seat 120 connected thereto, and a ball bearing assembly 122 supported within the cage. Central bearing support means 124 are also provided which include a bearing cage 126 having a cylindrical seat 128 and with the cage being pilotably inserted in the inner centralized bore 76 of the carrier body, and a tapered roller bearing assembly 130 mounted within the bearing cage.

The rotating members of the differential steering mechanism 34 illustrated in FIG. 4 include first, second and third interconnected planetary gear sets 132, 134 and 136 respectively, which are aligned along the transverse axis 78. The first planetary gear set 132 includes the first ring gear element 108, a first sun gear element 138, a first carrier element 140, and a plurality of first planetary gears 142 rotatably mounted on the carrier. This planetary set provides a speed reduction as a result of the grounded ring gear element, and the carrier element thereof serves as an output to conjointly drive a right axle shaft 144 via a spline joint 146.

A locator mechanism 145 is used to prevent axial outward movement of the axle shaft 144 as is shown in FIGS. 1 and 4. The right axle shaft has a radial flange 147 that is adapted to be axially entrapped between the outer end of the carrier element 140 and a retention fork 148. The retention fork has a downwardly facing semicircular slot 150 that embraces the axle shaft. The fork also has a lifting aperture 152 at the upper end thereof. The sides of the fork are entrapped between a pair of guide rails 154 releasably secured to the annular member 110, and the bottom of the fork is supported by a pair of dowels 155 or equivalent stop members secured to the guide rails.

The second planetary gear set 134 includes ring gear, sun gear, and planet carrier elements 156, 158 and 160 of the typical type wherein a plurality of planet gears 162 are in intermeshing toothed engagement with the ring and sun elements. A shaft 164 interconnects the first and second sun gear elements 138 and 158 for conjoint rotation.

The third planetary gear set 136 likewise includes ring gear, sun gear, and planet carrier elements 166, 168 and 170 and a plurality of planet gears 172 rotatably mounted on the carrier element. The third planet carrier element 170 is connected for joint rotation with the second ring element 156, and the third sun gear element 168 is connected for joint rotation with the second sun gear element 158 and thus to the shaft 164.

While the first or right carrier element 140 serves as the first output of the differential steering mechanism 34 to the right axle shaft 144, the third or left carrier element 170 serves as the second output to a corresponding left axle shaft 174. The left side has an axle shaft retention system similar to that of the locator mechanism 145 on the right side, and so need not be explained in detail.

A first bevel gear 176 is driven by the primary input pinion gear 88, and is releasably secured to a hollow shaft 178 by a plurality of fasteners 180. The shaft is rotatably supported by the opposed tapered bearing assemblies 106 and 130, and is provided with a spline joint 182 for conjointly driving the second carrier element 160. A multi-speed and reversible transmission, not shown, is provided for powerably rotating the input pinion gear.

As shown in FIGS. 4 and 7, a secondary input pinion gear 184 and associated shaft 185 is provided for driving a second bevel gear 186 for effecting steering of the vehicle 10. The secondary input pinion gear is mounted for rotation about the vertical axis 48 in a pair of tapered roller bearing assemblies 188 and 190. These bearing assemblies are supported in a bearing cage 192 and adjusted by a spanner nut 193 screwthreadably secured on the shaft of the pinion gear 184. Bearing cage 192 is piloted in the bore 46 and is releasably secured to the planar supporting portion 42 of the carrier body 38 by a plurality of fasteners 194 screwthreadably received in the bores 58. Preferably, the vertical axis 48 intersects the transverse axis 78. A spline joint 196 is formed in the input shaft 185 so that a reversible hydraulic steering motor may be releasably coupled thereto, although it is not illustrated.

Referring to FIG. 4, it may be noted that the second bevel gear 186 and the third ring gear element 166 are integrally coupled together or are of one-piece construction. These gears are supported by a left annular element 198 and a right annular element 200 secured thereto. Specifically, a bronze sleeve bushing 202 is connected within the annular element 198 so that it is supported on the seat 120 of the bearing cage 118, and another bronze sleeve bushing 204 is connected within the annular element 200 so that it is supported on the seat 128 of the bearing cage 126. The sleeve bushings have an L-shaped cross section, with the left sleeve bushing 202 being adapted to transmit both radial loads and any thrust loads from the pinion gear 184 and bevel gear 186 mesh to the left when viewing FIG. 4 against the cage 118. On the other hand, the right sleeve bushing 204 transmits only radial loads. This construction forms a stable straddle mount for the second bevel gear, maintaining the desired tooth loading pattern and minimizing noise generation.

INDUSTRIAL APPLICABILITY

Referring to FIG. 4, the assembly of the steering differential mechanism 34 involves initially installing the primary pinion gear 88 within the carrier body 38. Specifically, the cage 94 is secured to the carrier body by screwthreaded installation of the fasteners 96, with the outer roller bearing assembly 92 being supported in the cage and the inner roller bearing assembly 90 being disposed against the shouldered bore 82. Shims may be utilized at the mounting flange 86 to achieve the desired setting of the opposed bearing assemblies although they are not illustrated.

Then the inner bearing cage 126 and associated bearing assembly 130 is connected to the carrier body 38 from the left side when viewing FIG. 4 and the bevel gear 176, the hollow shaft 178, the annular member 100, the bearing cage 104 and associated bearing assembly 106 is installed from the right side. Shims, not shown, can be installed between the inner bearing cage 126 and the carrier body 38 and also between the bearing cage 104 and the annular member 100 for achieving the desired bearing setting. The fasteners 102 are screwthreaded into the carrier body, and the amount of backlash measured between the intermeshing teeth of the pinion gear 88 and the bevel gear 176. With the backlash known, for example, the desired amount of shims can be removed from under bearing cage 104 and installed under bearing cage 126 to shift the bevel gear axially to the left when viewing FIG. 4 and to obtain a the desired backlash.

The sun gears 138, 158 and 168 are preferably releasably secured to the shaft 164 by a conventional system such as by suitable spline joints and retaining ring locks. For example, the shaft 164 and the sun gear 138 can be inserted from the right side through the hollow shaft 178 when the sun gears 158 and 168 are not on the shaft. Then the ring gear 132, the annular member 110, the first carrier element 140 and associated planet gears 142 and the ball bearing assembly 112 are mounted on the annular member 100.

At the left side, the right annular element 200 is pilotably mounted on the bearing cage 126, and the second carrier element 160 and associated planet gears 162 mounted on the spline joint 182. The second and third sun gear elements 158 and 168 are subsequently secured to the center shaft 164, and the third carrier element 170 and associated planet gears 172 with the second ring gear element 156 secured thereto is pilotably inserted over the second carrier element 160. Next the common ring gear element 166 and input bevel gear 186, and the left annular element 198 are secured to the right annular element 200. Then the annular member 116, the bearing cage 118, and the ball bearing assembly 122 are mounted on the flange 68 of the carrier body 38. A preselected shim pack, not illustrated, is preferably included between the cage 118 and the annular member 116.

Referring to FIG. 7, the spanner nut 193 is screwthreadably installed on the shaft 185 in order to rotatably mount the pinion gear 184 within the bearing cage 192 with the desired bearing setting. An annular spacer of preselected thickness, not illustrated, is temporarily installed about the pinion gear 184 and in abutment with the inner race of the bearing assembly 188. Then the bearing cage 192 is mounted on the carrier body 38 by screwthreadably installing the fasteners 194 therein. The temporary spacer abuts the cylindrical periphery of the bevel gear 186 and provides a gap between the bearing cage 192 and the carrier body 38 that is then measured. The cage subassembly is then removed from the carrier body and the temporary spacer removed, and then the subassembly is reinstalled on the carrier body with a preselected shim pack, not illustrated but based on the aforementioned gap measurement, to position the pinion gear in a proper radial relationship with respect to the bevel gear 186. At this stage a dimensional reading is taken as by a dial indicator, of the backlash between the pinion gear and the bevel gear.

Subsequently, the bearing cage 118 is removed and the width of the shim pack reduced between that bearing cage and the annular member 116 to the amount indicated by such dimensional reading. This moves the bevel gear slightly to the right when viewing FIG. 4 and into the desired backlash engagement with the teeth of the pinion gear 184.

The differential drive assembly 32 can be lifted as a preassembled package and lowered into position within the vehicle case 12 shown in FIGS. 8 and 9. At that time the axle shafts 144 and 174 are displaced axially outwardly from the positions illustrated in FIG. 4 to provide room for the differential drive assembly, and the retention forks 148 are not yet installed. Upon screwthreadably securing the fasteners 64 into the case as shown in FIG. 7, a mechanic can reach down through each of the open access openings 50 with a suitable service tool and force the axle shafts 144 and 174 axially inwardly into engagement with the respective spline joints 146. The retention forks 148 are then lowered between the guide rails 154 into an entrapping relationship with the flanges 147 of the axial shafts as can be clearly visualized with reference to FIG. 1. The cover plates 60 are then installed to substantially complete the assembly of the differential drive assembly 32 in the vehicle.

In operation, when the left and right output carrier elements 170 and 140 are rotated in the same direction at the same speed the track-type vehicle 10 will travel in a straight-ahead mode. In such a mode of operation, the primary input pinion gear 88 shown in FIG. 4 is rotatably driven by the transmission and the secondary input pinion gear 184 shown in FIG. 7 is held stationary by the associated steering motor. While the transmission and steering motor are not illustrated, a more complete description of such components and the full operational relationships between the planetary gear sets 132, 134 and 136 is to be found in previously noted U.S. Pat. No. 4,434,680, the full contents of which are incorporated herein by reference.

However, in the straight-ahead mode the second carrier element 160 is rotatably driven by the pinion gear 88 and the bevel gear 176 in a counterclockwise direction when viewing along the axis 78 from the right side of FIG. 4. The second ring gear element 156 is thereby forced to rotate in a counterclockwise direction at a slower rate of speed than the input. Also, the interconnected sun gear elements 138,158 and 168 rotate together in a counterclockwise direction at a faster rate of speed than the input. Because the first and third ring gear elements 108 and 166 are held stationary as reaction members, the first carrier element 140 and the third carrier element 170 rotate in a counterclockwise direction at a rotational rate somewhat reduced in speed from that of the input speed.

In order to steer the vehicle 10, the steering motor is actuated to rotate the steering input pinion gear 184 in either direction at a rate determined by the steering angle desired. Assuming a turn to the left is desired while traveling forward, then the input pinion gear 184 is driven sufficient to drive the third ring gear element 166 in a clockwise direction. This causes a reaction on the third planet gears 172 such that the speed of the third carrier element 170 is reduced. Simultaneously, the speed of the sun gears 138, 158 and 168 increases with the result that the first carrier element 140 is forced to speed up. Since the speed of the third carrier element 170 and left axle shaft 174 is reduced, and the speed of the first carrier element 140 and right axle shaft 144 is increased, the vehicle makes a steering correction to the left. A steering correction to the right can be made by reversing the direction of rotation of the steering input pinion gear 184.

Thus it can be appreciated that the modular differential drive assembly 32 of the present invention is an extremely compact package that can quickly and expeditiously be connected to or separated from a case or axle housing 12 due to the construction of the mounting means 36. More particularly, the construction of the unitized carrier body 38 and the plurality of bearing cages 94, 104, 126, 118 and 192 allows convenient mounting of the rotating elements of the differential steering mechanism 34. The adjustable bearing cages in the precisely aligned bores of the sturdy centralized carrier body provides considerable design flexibility and contributes to the ease of assembly of the rotating elements, and especially to the ease of assembly of the bevel gears 176 and 186, and to the ease of assembly of the pinion gears 88 and 184 intermeshing therewith in planes perpendicular to the central axis 78. The top deck mounting of the differential drive assembly is also advantageous in the upwardly facing opening 14 in the vehicle case 12, so that the differential drive assembly is substantially fully contained therein and does not undesirably protrude where it could be otherwise damaged in use.

In marked contrast to many prior art axle housings, it is not necessary to laterally separate a plurality of transversely juxtaposed housing parts or to disassemble the laterally outwardly disposed final drive mechanisms in order to remove the differential drive assembly for convenient servicing.

Also, other features of the differential drive assembly 32 involve the ease of accessibility to the locator mechanisms 145 for holding the axle shafts 144 and 174 in positive driven engagement with the opposite planet carrier elements 140 and 170, and the overall structural integrity of the straddle mounting of the steering input bevel gear 186.

Other aspects, objects and advantages of this invention can be obtained from a study of the drawings, the disclosure and the appended claims.

We claim:

1. A differential drive assembly for a vehicle having a case defining an outwardly facing opening and a first mounting face peripherally about the opening, comprising:

a differential steering mechanism including a first input gear, a second input gear, and a plurality of interconnected and cooperating planetary gear elements driven by the input gears, two of the planetary gear elements serving as output elements and each being adapted to be driven at different speeds in response to rotation of the second input gear for steering the vehicle; and mouting means for rotatably supporting the input gears and the planetary gear elements along a transverse central axis and for modularly positioning the differential steering mechanism in a protected location within the opening of the case, the mounting means including a one-piece carrier body defining a second mounting face adapted to be releasably matingly connected to the first mounting face of the case.

2. The differential drive assembly of claim 1 wherein the opening in the case faces upwardly allowing the mounting means and the differential steering mechanism to be lowered into a secured position depending from the first mounting face.

3. The differential drive assembly of claim 2 wherein the carrier body has a generally planar supporting portion defining the second mounting face and a plurality of contoured walls depending therefrom and formed as a one-piece integral casting with the supporting portion.

4. The differential drive assembly of claim 3 wherein the differential steering mechanism includes a first input pinion gear and a second input pinion gear, the mounting means including cage means for rotatably supporting the first and second pinion gears in right angle driving relationship to the first and second input gears respectively.

5. The differential drive assembly of claim 4 wherein the cage means includes a first bore defined in the carrier body having a first axis that, in use, is horizontal and intersects the central axis, a first bearing cage in the first bore, and bearing means for rotatably supporting the first input pinion gear in the first bearing cage.

6. The differential drive assembly of claim 5 wherein the cage means includes a second bore defined in the planar supporting portion of the carrier body and having a second axis that is vertical and intersects the central axis, a second bearing cage in the second bore, and bearing means for rotatably supporting the second input pinion gear in the second bearing cage.

7. The differential drive mechanism of claim 1 wherein the differential steering mechanism includes a first input pinion gear releasably connected to and rotatably supported by the carrier body along a first axis and a second input pinion gear releasably connected to and rotatably supported by the carrier body along a second axis, the first and second axes being located in separate planes individually arranged generally normal to the transverse central axis.

8. The differential drive mechanism of claim 7 wherein, in use, the first axis is horizontal and intersects the transverse central axis.

9. The differential drive mechanism of claim 7 wherein, in use, the second axis is vertical and intersects the central axis.

10. The differential drive mechanism of claim 1 wherein the differential steering mechanism includes first and second input pinion gears, the carrier body includes a generally planar supporting portion and a plurality of contoured walls, the first input pinion gear being rotatably mountable on the contoured walls and the second input pinion gear being rotatably mountable on the planar supporting portion.

11. The differential drive assembly of claim 10 wherein the mounting means includes first bearing cage means for rotatably supporting the first input pinion gear along a generally horizontal axis.

12. The differential drive assembly of claim 11 wherein the mounting means includes second bearing cage means for rotatably supporting the second input pinion gear along a generally upright axis.

13. The differential drive assembly of claim 1 wherein the mounting means includes bearing support means for straddle mounting the second input gear on the carrier body.

14. The differential drive assembly of claim 1 wherein the mounting means defines first and second cylindrical bearing seats spaced apart along the central axis, the second input gear being rotatably supported on the bearing seats therebetween.

15. The differential drive assembly of claim 1 wherein two of the planetary gear elements serve as output members, the vehicle includes first and second axle shafts releasably connected to the output members, and the mounting means includes retaining means for limiting transverse axial movement of the axle shafts during use.

16. The differential drive assembly of claim 15 wherein the retaining means includes first and second access openings in the carrier body, and first and second retention forks adapted to entrap the axle shafts and being releasable through the access openings.

17. A differential drive assembly for a vehicle having a case defining an upwardly facing opening, comprising:
a differential steering mechanism including first and second input pinion gears, first and second bevel gears driven by the first and second pinion gears respectively, a plurality of interconnected planetary gear elements driven by the bevel gears; and
mounting means for rotatably supporting the bevel gears and the planetary gear elements along a central axis and the pinion gears normal to the central axis, for positioning the differential steering mechanism as a modular subassembly in a protected location within the opening of the case, and for releasably securing the differential steering mechanism to the case about the opening.

18. The differential drive assembly of claim 17 wherein the mounting means include a one-piece carrier body defining first and second bores perpendicular to the central axis, and bearing cage means for rotatably mounting the first and second pinion gears in the respective bores.

19. The differential drive assembly of claim 18 wherein the mounting means includes first and second spaced apart bearing means for rotatably supporting the second bevel gear therebetween.

20. The differential drive assembly of claim 17 wherein the mounting means includes a carrier body defining a generally planar supporting deck and a plurality of contoured walls formed together as a one-piece integral casting.

21. The differential drive assembly of claim 20 wherein the body defines a plurality of cylindrical bores, and the mounting means includes a plurality of bearing cages and a plurality of bearing assemblies seated within the bearing cages for supporting the pinion gears, the bevel gears, and the plurality of interconnected planetary gear elements.

22. A differential drive assembly for a vehicle having a case defining an upwardly facing opening, comprising:
a differential steering mechanism including first and second input bevel gears, first and second oppositely disposed output members, and a plurality of operatively associated planetary gear elements interconnecting the bevel gears and the output members; and
mounting means for rotatably supporting the bevel gears, the output members, and the plurality of gear elements along an axis, the mounting means including a one-piece carrier body defining an upper deck and a plurality of contoured walls depending from the deck, the deck being releasably secured to the case about the opening.

23. The differential drive assembly of claim 22 wherein the differential steering mechanism includes a steering input pinion, the deck defines a bore therethrough, and the mounting means further includes means for rotatably mounting the steering input pinion in the bore in intermeshing relation with the second bevel gear.

* * * * *